J. M. DE SAINT MARTIN.
CONNECTING MEANS FOR SPRINGS IN VEHICLES AND THE LIKE.
APPLICATION FILED OCT. 10, 1912.
1,075,498.
Patented Oct. 14, 1913.
Fig. 1.
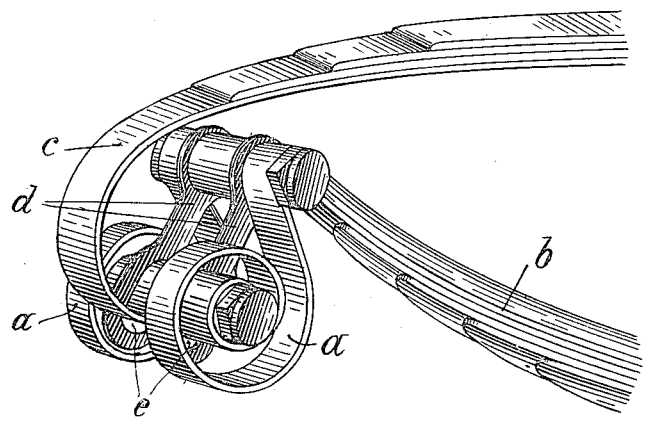
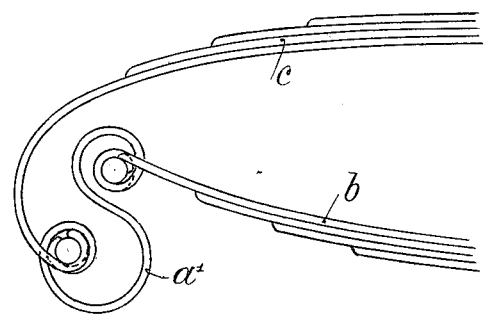
Fig. 2.

UNITED STATES PATENT OFFICE.

JACQUES MINETTE DE SAINT MARTIN, OF PARIS, FRANCE.

CONNECTING MEANS FOR SPRINGS IN VEHICLES AND THE LIKE.

1,075,498.

Specification of Letters Patent.   Patented Oct. 14, 1913.

Application filed October 10, 1912. Serial No. 725,015.

*To all whom it may concern:*

Be it known that I, JACQUES MINETTE DE SAINT MARTIN, a citizen of the Republic of France, and resident of 210 Faubourg St.-
Martin, Paris, France, have invented certain new and useful Improvements in Connecting Means for Springs in Vehicles and the like, of which the following is a specification.

The present invention relates to flexible means for connecting the ends of the bearing or laminated flat springs in vehicles and the like.

It is known that in vehicles and more particularly in automobiles, the bearing springs used for connecting the car to the wheels do not vibrate with sufficient rapidity for absorbing the numerous oscillations incident to the rolling of the vehicle over small sized obstacles such as the paving stones on roads for instance. Moreover the springs do not properly respond to these small oscillations which are accumulated or totalized in such manner that the wheels rebound, thus causing a rapid wear of the tires. The bearing springs are generally connected together at their outer ends by means of hinged rigid plates called shackles.

The object of the present invention is to replace these rigid shackles by flexible means or elastic metal bands formed in a spiral spring, of simple and cheap construction, and being so provided in relation to the ends of the vehicle bearing springs that they will absorb the small and light vibrations transmitted directly by the axle of the vehicle, said vibrations being almost deadened on traversing the relatively large coils of the spiral spring, so that they will exert no influence upon the tension or reaction of the laminated bearing springs.

In the annexed drawing: Figure 1 shows a perspective view of the end of the bearing springs of an automobile vehicle, provided with the present improved flexible connecting means; Fig. 2 is a side elevation of a modified construction.

Referring to Fig. 1 of the drawing the flexible connecting means consist of a metal band $a$ coiled on itself so as to form a double coil, the ends of which are connected below the scroll iron of the ordinary bearing springs $b$ and $c$ of the vehicle. In the form shown in Fig. 2 the band $a^1$ instead of having the two coils inside one another has the lower coil connected to the spring $c$ and the upper coil rolled in the opposite direction connected to the spring $b$. The flexible shackles $a$ thus formed are mounted preferably one on each side of the springs $b$ and $c$ and they are pivoted on the ordinary pins of the scroll irons of the springs as shown in Fig. 1 and held in position on said pins by the ordinary nuts. The section and length of the flexible members $a$ may of course vary in accordance with the weight or load of the vehicle to which they are applied.

When it is desired to obviate breakage of the flexible scroll spring shackles, suitable plates or shackles $d$ may be used in combination as shown in Fig. 1, said plates parallel with the flexible members being pivoted near their upper end to the bearing spring $b$ and having a longitudinal slot $e$ for the free passage and play of the pin or bolt on which are connected the springs $a$ and $c$.

Having now described and ascertained the nature of my said invention, I declare that what I claim is:

1. In vehicles, scroll spring shackles for connecting the bearing springs, in which the inner end of one of the coils of the scroll is connected to the upper bearing spring while the end of the outer or upper coil of the scroll is connected to the lower bearing spring of the vehicle.

2. Flexible shackles for connecting the ends of vehicle bearing springs, in combination with a lower connecting pin and plates having a longitudinal slot through which the lower connecting pin freely slides.

The foregoing specification signed at consulate of the U. S. A. at Nice, France, this thirtieth day of September, 1912.

JACQUES MINETTE DE SAINT MARTIN.

In presence of two witnesses:
 JOSEPH VAN DAM,
 ERNEST BROE.